(No Model.)
J. LONG.
COUPLING.
No. 510,353.
Patented Dec. 5, 1893.
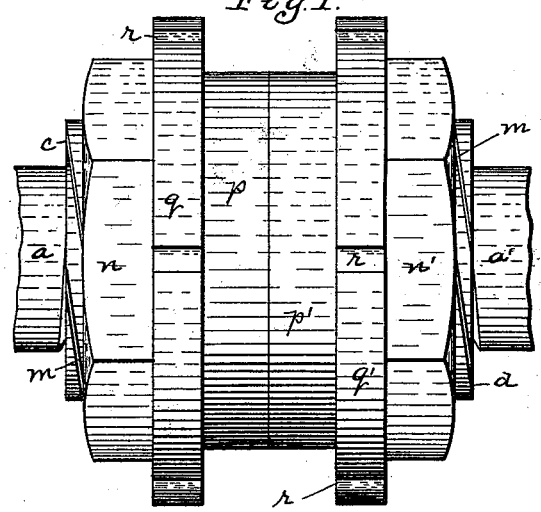
Fig. 1.
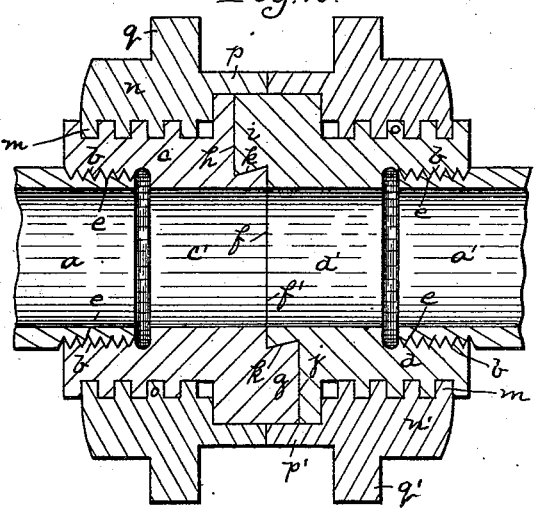
Fig. 2.
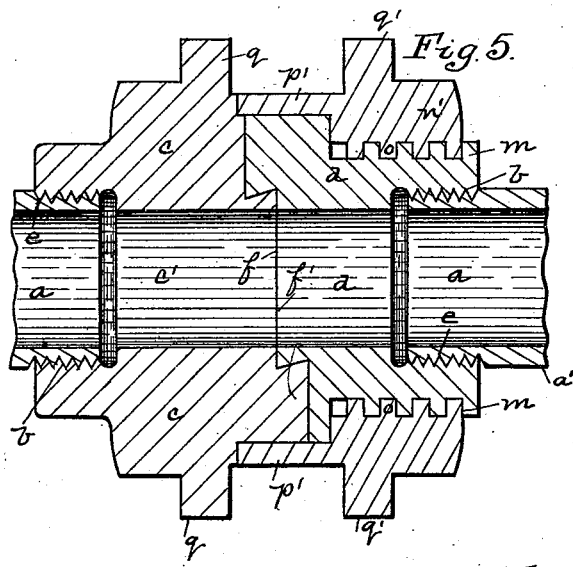
Fig. 5.
Fig. 3.
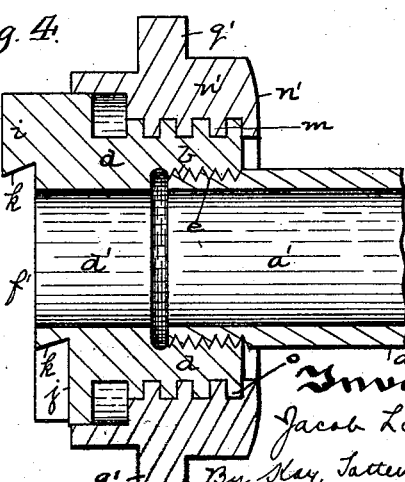
Fig. 4.
Witnesses:
Inventor,
Jacob Long.
By Kay, Totten & Cooke,
Attorneys.

UNITED STATES PATENT OFFICE.

JACOB LONG, OF ALLEGHENY, ASSIGNOR OF ONE-HALF TO GEORGE M. VON BONNHORST, OF PITTSBURG, PENNSYLVANIA.

COUPLING.

SPECIFICATION forming part of Letters Patent No. 510,353, dated December 5, 1893.

Application filed August 19, 1892. Serial No. 443,506. (No model.)

*To all whom it may concern:*

Be it known that I, JACOB LONG, a resident of Allegheny, in the county of Allegheny and State of Pennsylvania, have invented a new and useful Improvement in Couplings; and I do hereby declare the following to be a full, clear, and exact description thereof.

My invention relates to couplings for hose, pipes, &c., its object being to provide a coupling in which the parts composing the same can be coupled together or taken apart quickly and without great inconvenience in handling, and at the same time forming a tight joint so that the fluids passing therein cannot escape by leakage through the joint of the coupling.

My invention consists essentially in a coupling provided with two members, each having a flat face to contact with the other, and each having a lug and a recess projecting from and extending into said face, said lugs and recesses having dovetailed side edges engaging with each other by a side or transverse movement.

It also consists in certain other details of construction which will be more fully hereinafter set forth and claimed.

To enable others skilled in the art to make and use my invention, I will describe the same more fully, referring to the accompanying drawings in which—

Figure 1 is a side view of my improved coupling. Fig. 2 is a longitudinal section of the same. Fig. 3 is a face view of one of the engaging faces of the coupling. Fig. 4 is a longitudinal section showing the parts ready for coupling, and Fig. 5 is a longitudinal section of another form of coupling.

Like letters of reference indicate like parts in each of the views.

My invention is illustrated for the coupling of hose or tubing, although it may be used in connecting or coupling water or hose plugs, rods, &c. The hose or pipes $a\ a'$ are provided on their exterior surfaces with the screw threads $b$ around which are connected the coupling members $c\ d$ by means of the screw threads $e$ fitting in the screw threads $b$ on the hose or pipes $a\ a'$. The members $c\ d$ have the openings $c'\ d'$ for the passage of the fluids therein, and the said members $c\ d$ have the engaging faces $f\ f'$ thereon. The member $c$ has on its engaging face $f$ the lug $g$ and recess $h$, and the member $d$ has on its engaging face $f'$ the lug $i$ and recess $j$, the lug $g$ on the member $c$ being opposite the recess $j$ on the member $d$ and the recess $h$ being opposite the lug $i$ on the member $d$ when the members $c\ d$ are brought together for coupling. The side and front meeting edges of the lugs $g\ i$ and recesses $h\ j$ are dovetailed as at $k$, and the members $c\ d$ are cored out at $l$ in order to lighten the parts. The two members $c\ d$ are provided with the screw threads $m$ on their exterior faces, and in order to cover the joint made by the engaging faces $f f'$ on the members $c\ d$ and prevent all liability of leakage at said joint, there are screwed on the members $c\ d$ the nuts $n\ n'$ which engage by their screw threads $o$ with the screw threads $m$ on the two members $c\ d$. These nuts $n\ n'$ have the sleeves $p\ p'$ thereon adapted to surround the joint made by the engaging faces $f\ f'$, and they are also provided with the flanges $q\ q'$ thereon, so that a tool or wrench may engage with the holes or notches $r$ therein to tighten or loosen the nuts as is desired.

In Fig. 5 is shown another form of my improved coupling as applied to a water hose or fire plug, which does away with the nut $n$, the member $c$ acting as the nut and having the engaging face $f$ thereon. The member $c$ is attached permanently to the pipe in the plug and the member $d$ being attached to the hose or connecting pipe, the member $d$ having its sleeve $p'$ longer so as to cover the joint made by the engaging faces of the coupling.

In the use of my improved coupling the members $c\ d$ are generally permanently attached to the hose or pipes $a\ a'$ with their engaging faces $f f'$ opposite each other, and the nuts $n\ n'$ screwed back from the engaging faces $f f'$ of the coupling. In case it is desired to couple, it is only necessary to place the members $c\ d$ in a position so that the lug $g$ and recess $h$ on the member $c$ are opposite or in line with lug $i$ and recess $j$ on the member $d$, when by a side or transverse movement the two members $c\ d$ can be brought together, the member $c$ with its lug $g$ fitting into the recess $j$ on the member $d$, and the lug $i$ on the member $d$ fitting into the recess $h$ on the member $c$, so bringing the engaging faces $f f'$ of the members $c\ d$ into contact with each other. When the coupling is made as above described, the dovetailed side and front faces $k$ of the lugs $g\ i$ and recesses $h\ j$ on the members $c\ d$ bind one upon the other and form a tight joint. After the coupling has been made, the nuts $n\ n'$ are then screwed up through the medium of the threads $o$ thereon engaging with the threads $m$ on the members $c\ d$, the sleeves $p\ p'$ on the nuts $n\ n'$ meeting and forming the completed coupling. All liability of leakage is prevented on account of the dovetailed side and front meeting edges $k$ on the lugs $g\ i$ and recesses $h\ j$ and the nuts $n\ n'$ which cover the opening formed by the engaging faces $f f'$ of the members $c\ d$ of the coupling.

To uncouple or detach the parts composing the coupling, all that is necessary is to unscrew the nuts $n\ n'$ back far enough so as to clear the engaging faces $f f'$ of the members $c\ d$, when the two members $c\ d$ can be separated from each other by a side or transverse movement, so freeing the lug $g$ on the member $c$ from contact with the recess $j$ on the member $d$, and the lug $i$ on the member $d$ from contact with the lug $h$ on the member $c$, so separating the parts and putting them in position to be coupled again. The coupling can be screwed up and unscrewed rapidly on account of the two members being joined and separated by the side or transverse movement, and the nuts $n\ n'$ having their threads $o$ thereon which engage with the threads $m$ on the members $c\ d$ made double-threaded or heavy.

The coupling is simple and durable in construction, not liable to injury or get out of order and permits of quick coupling or uncoupling. All liability of leakage is prevented as practical experience has proven that the coupling forms a tight joint.

What I claim as my invention, and desire to secure by Letters Patent, is—

1. In a coupling, the combination of two members, each having a flat face adapted to come into contact with the other, and each having a lug and a recess projecting from and extending into said face, said lugs and recesses having dovetailed side edges and engaging with each other by a side or transverse movement, substantially as set forth.

2. In a coupling, the combination of two members, each having a flat face adapted to come into contact with the other, and each having a lug and a recess projecting from and extending into said face, said lugs and recesses having dovetailed side edges and dovetailed front edges, and engaging with each other by a side or transverse movement, and a screw threaded sleeve engaging with one of said members and adapted to pass over said lugs to hold the coupling closed, substantially as set forth.

3. In a coupling, the combination of two members, each having a flat face adapted to come into contact with the other, and each having a lug and a recess projecting from and extending into said face, said lugs and recesses having dovetailed side edges and engaging with each other by a side or transverse movement, and a screw threaded sleeve engaging with one of said members and adapted to pass over said lugs to hold the coupling closed substantially as set forth.

In testimony whereof I, the said JACOB LONG, have hereunto set my hand.

JACOB LONG.

Witnesses:
ROBT. P. NEVIN, Jr.,
ROBT. D. TOTTEN.